INVENTOR.
PHILIP H. SANFORD

Dec. 23, 1969          P. H. SANFORD          3,485,104
                DIFFERENTIAL PRESSURE MEASURING DEVICE
Filed Oct. 5, 1967                              2 Sheets-Sheet 2

INVENTOR.
PHILIP H. SANFORD
BY
*Curtis, Morris + Safford*
ATTORNEYS

United States Patent Office 3,485,104
Patented Dec. 23, 1969

3,485,104
DIFFERENTIAL PRESSURE MEASURING DEVICE
Philip H. Sanford, Walpole, Mass., assignor to The Foxboro Company, Foxboro, Mass.
Filed Oct. 5, 1967, Ser. No. 673,074
Int. Cl. G01l 7/08
U.S. Cl. 73—407                               8 Claims

ABSTRACT OF THE DISCLOSURE

A single diaphragm is subjected to a differential pressure and transmits a corresponding force through a link to an indicating arm capable of angular deflection proportional to the applied force. The magnitude of angular deflection is sensed to give an output reading corresponding to the magnitude of the differential pressure. Surrounding the indicating arm is an incompressible liquid contained by two bellows so oriented that any expansion of the liquid fill due to changes in ambient temperature does not influence the measurement represented by the angular deflection.

BACKGROUND OF THE INVENTION

This invention relates to apparatus for measuring differential pressure and more particularly to a novel differential pressure meter adapted to be used in instrument systems which may indicate, record or control the differential pressure, and is adapted to transmit the value of measured differential pressure, e.g., developed across the orifice of a pipeline carrying a flowing fluid, to another instrument or regulating device located at a remote point. Examples of prior differential pressure measuring apparatus are disclosed in Bowditch Patents 2,770,258 and 3,252,383.

The first of these patents discloses a so-called force-balance meter which includes a double-diaphragm capsule containing a liquid fill. The other patent discloses a so-called motion balance meter having a pair of sealed bellows containing a liquid fill. In both of these devices provision must be made to minimize errors introduced by thermal expansion of the liquid fill. This is accomplished in the 2,770,258 patent by reducing the free space within the diaphragm capsule to a minimum, securing the centers of the diaphragm together by a rigid connection, and selecting diaphragms which are substantially identical. In the 3,252,383 patent, only one bellows is connected to the read-out mechanism, and bimetallic strips are provided on an end of the other bellows so that any thermal expansion of the fluid is accommodated by a corresponding expansion of the end convolution of that other bellows without affecting in any substantial way the position of the read-out mechanism.

The present invention advantageously provides an arrangement that minimizes errors due to thermal expansion of a liquid fill without requiring any special temperature compensation elements.

In the use of devices of this type, the differential pressure being measured is substantially less than the static pressure of the process bow line, for example a flowmeter operating at a static pressure of 1500 p.s.i. may be used to measure pressure differentials of 100 inches of water or less. This differential represents the range that the meter must measure. At times it is desirable to change the range of the instrument. In the disclosed embodiment, this can be accomplished by a simple replacement of a sealed liquid-filled read-out unit, although of course, small range changes can be made by an electrical span adjustment.

Accordingly, it is an object of the present invention to provide a differential pressure measuring apparatus that is superior to apparatus provided heretofore.

It is a further object of this invention to provide a differential pressure measuring apparatus that effectively minimizes errors due to thermal expansion of an incompressible liquid fill.

A still further object of the present invention is to provide a differential pressure measuring apparatus that can conveniently and easily be maintained without necessitating any prolonged disruption in service.

SUMMARY OF THE INVENTION

In the disclosed embodiment of the present invention two fluids under pressure are conducted to the opposite sides of a diaphragm. Any differential pressure between the two fluids produces a lateral motion of the diaphragm which is transmitted to an indicating arm capable of angular deflection. Movement of the remote end of this indicating arm is sensed by electrical circuitry to produce an output signal responsive to the magnitude of the differential pressure applied to the diaphragm. The indicating arm is sealed within a double bellows chamber filled with an incompressible liquid to provide protection from the corrosive effects of the fluid flowing through the line. The liquid also provides a dashpot action that attenuates unwanted variations in the input signal and also acts to stabilize the response of the indicating arm by absorbing undesirable vibrations. Thermal expansion of the liquid fill due to ambient temperature changes produces corresponding expansion of the bellows but does not adversely affect the angular positioning of the indicator arm, and thus does not adversely affect the reading of the instrument.

BRIEF DESCRIPTION OF THE DRAWING

The objects and advantages of the present invention can best be understood and appreciated by reference to the accompanying drawing which illustrates a differential pressure measuring assembly incorporating a preferred embodiment of the invention and wherein.

DESCRIPTION OF THE PREFERRED EMBODIMENT

Figure 1:
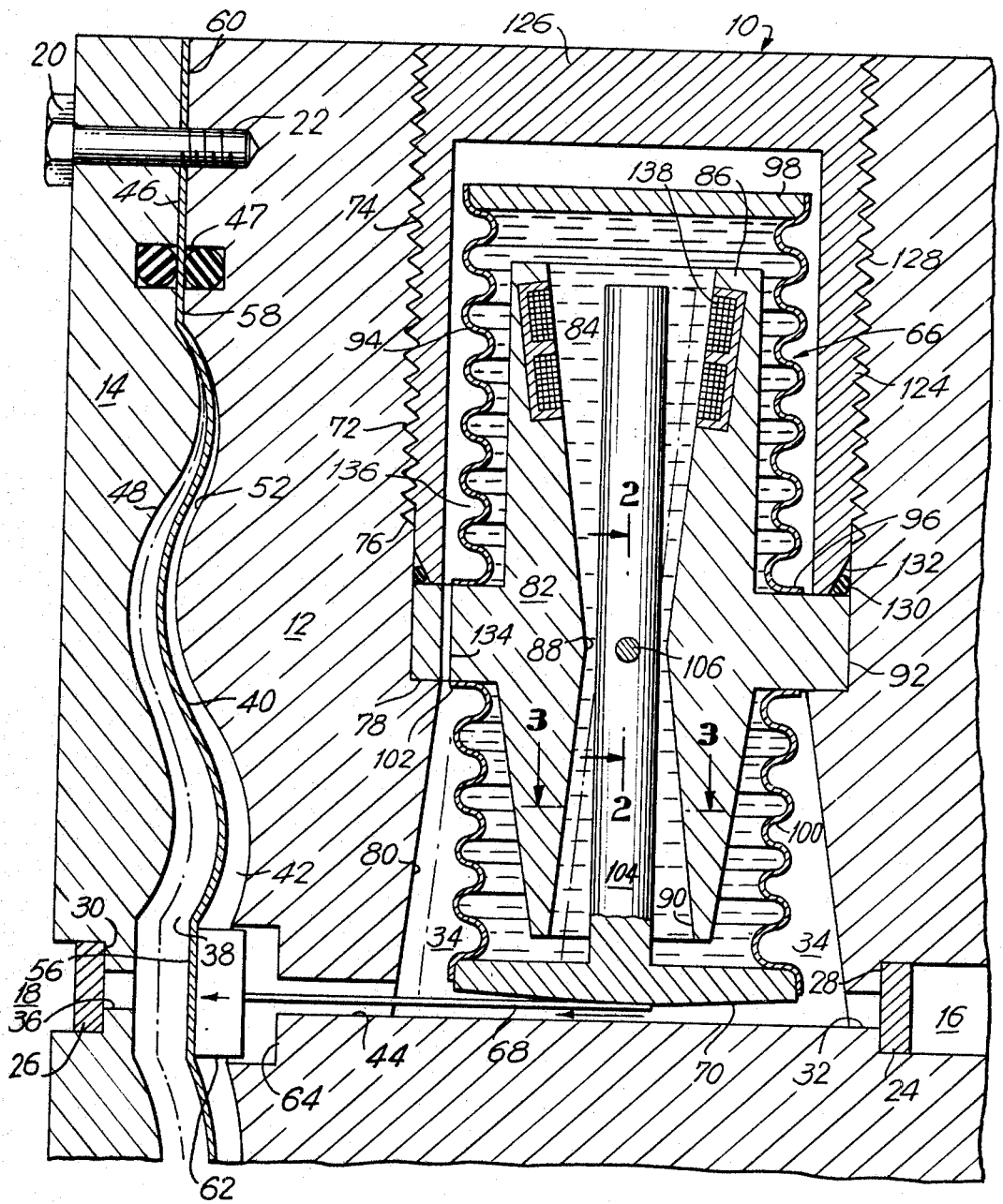
FIGURE 1 is a vertical central section showing the diaphragm, motion translating linkage and motion balance device of the present invention.

Referring now to FIGURE 1, there is shown generally at 10 a differential pressure measuring device having a housing 12 and cover plate 14 with inlet ports 16 and 18 therein respectively. Cover plate 14 is affixed to housing 12 in any convenient manner, e.g., threaded retaining bolts 20 through the cover plate into threaded bores 22 in the housing. The inlet ports are connected by suitable conduits (not shown) to respective sources of pressure. For example, the instrument may be connected to a conventional orifice-plate primary device mounted in a flow pipe and adapted to produce a pressure differential in accordance with the rate of fluid flow through the pipe, in the manner indicated in FIGURE 1 of Dowditch Patent No. 3,252,383.

Disposed in the inlet ports 16 and 18 are porous filter elements 24 and 26, respectively, that allow the passage of fluid and preclude the passage of any solid particles that may be entrained in the fluid. The filter elements 24 and 26 abut shoulder portions 28 and 30 within the inlet ports 16 and 18 respectively. A passage 32 provides fluid communication between inlet port 16 and an interior chamber 34 of the housing 12, and another passage 36 provides fluid communication between inlet port 18 and a chamber 38 between housing 12 and cover plate 14.

A convoluted circular diaphragm 40 is secured in place between the housing 12 and the cover plate 14. This diaphragm separates the chamber 38 from a second chamber 42 which communicates with inlet port 16 through a passage 44, interior chamber 34 and passage 32.

Around its circumference, cover plate 14 closely abuts housing 12 as shown in 46, and holds the diaphragm 40 securely in place by pressure engagement due to bolts 20. Suitable seals such as O-rings 47 prevent any fluid leakage between the cover and the housing. In its interior portion cover plate 14 is spaced from housing 12 and has a tapered convoluted surface 48 adapted to mate with the convolutions of the diaphragm. The housing 12 similarly has a tapered convoluted surface 52 adapted to mate with the diaphragm. A circular attachment element 62 is secured to the diaphragm to the central portion 56, and the housing 12 is formed with a cylindrical recess 64 to receive this element when the diaphragm is moved a substantial distance to the right.

When there is no pressure differential between the fluid entering port 16 and the fluid entering port 18, the diaphragm will take a position illustrated by the solid line in FIGURE 1. If now a pressure differential is developed with the pressure in port 16 higher than in port 18, a corresponding force will be applied to the diaphragm 40 tending to move it to the left to a position illustrated by the broken line.

The lateral movement of the diaphragm, responsive to the differential pressure, is transferred by a connecting tension flexure 68 having one end secured to the attachment element 62 and the other to a closed lower end 70 of the unit 66.

The motion balance unit 66 converts the movement of the diaphragm 40 into an electrical signal that may be calibrated and read at an appropriate metering device. This unit is mounted within a bore 72 in housing 12. The bore 72 is substantially cylindrical and includes internal threads 74 ending at 76. The bore continues in a substantially cylindrical manner a further depth to a seating shoulder 78 and from shoulder 78 a still further depth, with an outwardly tapering surface 80, to communicate with the passages 32 and 44.

A support column 82 is seated against shoulder 78 by means of a raised annular collar 92 at approximately the midpoint of the support column 82. This column has a longitudinally extending passage 84 which tapers from a wider portion 86 at its upper end to a narrow portion 88 midway along the extent of the support column 82, and thence to a wider portion 90 at its lower end.

A top expansion bellows 94 is attached to an upper side 96 of the collar 92 and extends upward from the collar, completely enclosing the support column 82 and terminating in a closed end portion 98 above the top end of the support column 82. A motion-transmitting bellows 100 is attached to a lower side 102 of the collar and extends downward, completely enclosing support column 82 past the bottom end of the support column and ending in the closed bottom portion 70. An indicating arm 104 is attached to the closed bottom portion 70 of the lower bellows and extends upward within the internal passage 84 to a shaft 106, to be described in more detail hereinbelow, in the vicinity of the narrow mid-portion 88 of the passage 84.

Figure 2:
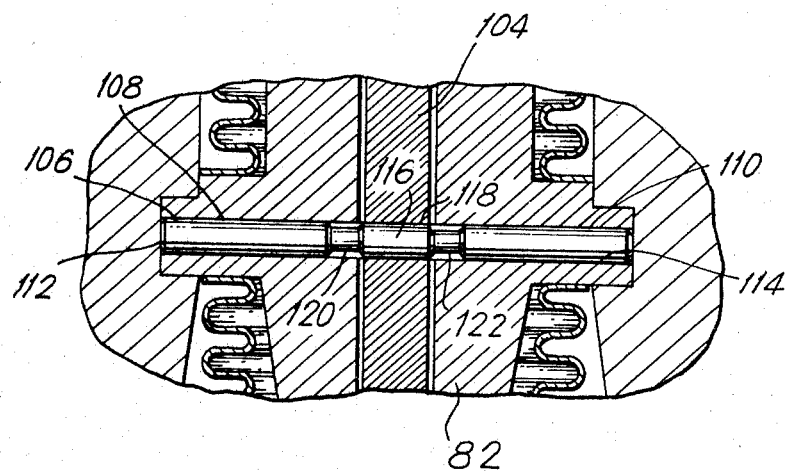
FIGURE 2 is a detail section taken along line 2—2 of FIGURE 1.

Before proceeding further, reference is now made to FIGURE 2 for a more complete description of the shaft 106. The shaft 106 has outer ends 108 and 110 rigidly secured, in any appropriate manner, within receiving bores 112 and 114 in the annular collar 92 of the support column. A central portion 116 is also rigidly secured, in any convenient manner, within a receiving bore 118 in the indicating arm 104. Immediately adjacent the central portion 116 are two necked-down portions 120 and 122. It is apparent that any force exerted on the indicating arm by the diaphragm 40 will cause a torsional stress to be imposed upon the shaft 106, and the necked-down portions 120 and 122 are sufficiently small in diameter to allow the indicating arm 104 to rotate a significant amount about the support shaft 106 as a fulcrum. Moreover, the extent of this rotation will be proportional to the applied force.

The flexible bellows 94 and 100 serve the purpose of creating an effective seal between the indicating mechanism and the corroding effects of any fluids that may be flowing in the process line. These bellows are filled with an incompressible liquid, e.g., oil, which prevents the collapse of the bellows from the static pressure in the line, and the inert nature of the liquid fill assures that no corrosive action will injure the electrical means for developing an output signal. The liquid also serves to attenuate undesirable variations in the input signal and to dampen rotational movement of the indicating arm 104, thus minimizing vibrations and flutter from external causes.

The motion balance unit 66 is retained within the bore 72 by means of a sleeve 124 having a closed end 126 and external threads 128 to engage the internal threads 74 of the bore. A sealing ring 130 rests on the upper portion of collar 92 in bore 72 and when sleeve 124 is engaged to its fullest extent the lower end of the sleeve, angled as at 132, compresses sealing ring 130 against collar 92 and bore 72 to form an effective seal.

A passage 134 is provided in the annular collar 92 to allow fluid communication between the lower chamber 34 and an upper chamber 136 containing the upper bellows 94. Thus it is apparent that the fluid entering through inlet port 16 will fill the lower chamber 34 and pass through the passage 134 to fill upper chamber 136. Accordingly, the motion balance unit 66 will be completely surrounded by this fluid.

When the indicating arm 104 is rotated as described above, the lower end of the bellows 100 will move laterally correspondingly. The outwardly sloping side surfaces 80 of the lower chamber 34 allow for the unimpeded lateral movement of the lower bellows. The indicating arm 104 also moves laterally, as indicated by the arrow in FIGURE 1, from a first position shown in solid line to a second position shown in broken line. When the differential pressure on the diaphragm is removed, the torsionally stressed shaft acts as a torsion spring and returns to its original position thus returning the indicating arm to its neutral position. The diameter of the necked-down portions of the shaft must be selected so that, for the span of differential pressures the device is to sustain, the torsional stress will not exceed the elastic limit of the shaft material. Thus there will be no permanent strain or deformation of the shaft.

A suitable electrical indicator such as the differential transformer shown at 138 or any other appropriate indicating device such as a capacitor detector, etc., is located in the upper portion of support column 82 and senses, by corresponding electrical changes, the relative movement of the upper end of the indicating arm 104. The changes in electrical output signal due to the movement of the indicating arm may be amplified and fed into any suitable indicating means, such as a meter. The meter will be calibrated to read in any units desired.

The differential pressure measuring apparatus of the present invention is adapted to be used as a flowmeter to measure fluid flow, usually liquid flow, in a pipeline. Typically an instrument of the present invention would be placed in close proximity to the pipeline at remote distances from the indicating meter where the flow condition is to be read. Thus, the instrument would be subject to varying ambient temperature conditions at the point where the device is located.

Since the bellows 94 and 100 are filled with an incompressible liquid, the liquid within the bellows will be subject to this varying ambient temperature condition and thus will expand and contract in volume according to the changes in ambient temperature around the instrument. In prior apparatus, the expansion and contraction of a liquid fill could introduce errors in the reading, and corrective or compensating devices often were incorporated to minimize the error. The present invention avoids such problems because the thermal displacement of the bellows is along an axis perpendicular to the axis of the measurement motion. Specifically, the bellows 94 expands and contracts vertically and thus does not affect the lateral positioning of the indicating arm 104. Thus the thermal expansion does not affect the reading.

The device of the present invention also lends itself to relatively simple maintenance. If any malfunction appears in the motion balance unit 66 it may be easily replaced by removing the sleeve 124 and, after disconnecting the link 68, the whole unit 66 may be removed and another substituted in its place. Also, the span of differential pressure may be changed, if a larger change is desired than can be accommodated by an electrical span adjustment, by replacing the unit 66 with another unit that has a support shaft 106 with necked-down portions 120 and 122 of a different diameter to thereby give a different resistance to torsional displacement. This feature eliminates the necessity of employing other balancing and calibration steps.

Figure 3:
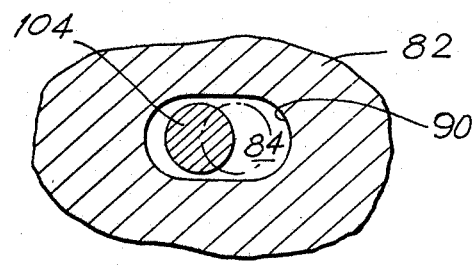
FIGURE 3 is a detail section taken along line 3—3 of FIGURE 1.

It is also to be noted, as shown in FIGURE 3, that the indicating arm 104 within the passage 84 in the support column is completely surrounded by the incompressible liquid confined in the bellows. This provides an internal dashpot effect that prevents any sudden movement of the arm 104.

The corrugations in the diaphragm and the mating convolutions 48 and 52 in the walls of the housing 12 and cover plate 14 avoid excessive deflection and permanent distortion of the diaphragm. In industrial applications of instruments of this type, the diaphragm is subjected to high static pressure on each face but occasionally, through inadvertence, the pressure on one side of the diaphragm may be vented at atmosphere thereby establishing a pressure difference across the diaphragm much larger than that which the instrument is intended to measure. When this occurs, the diaphragm 40 will seat against one or the other of the surfaces 48 or 52 so as to limit the deflection of the diaphragm and prevent damage.

As shown in FIGURE 3, the cross-sectional shape of the longitudinal passage 84, in the support column 82, is that of a rounded ovoid. The longer axis of the ovoid is oriented along the plane of movement of the indicating arm 104 and the walls are relatively close to the indicating arm along the axis where no movement is made. This allows for freedom of movement of the arm in the desired direction and yet reduces the internal volume of the passage 84 thereby keeping the volume of fill liquid to a minimum to keep any vertical thermal expansion to a minimum.

Although a specific preferred embodiment of the invention has been set forth in detail, it is desired to emphasize that this is not intended to be exhaustive or necessarily limitative; on the contrary, the showing herein is for the purpose of illustrating one form of the invention and thus to enable others skilled in the art to adapt the invention in such ways as meet the requirements of particular applications, it being understood that various modifications may be made without departing from the scope of the invention.

What is claimed is:

1. Differential pressure responsive apparatus adapted for use as a flowmeter and the like, comprising:
   means forming first and second pressure chambers disposed adjacent one another;
   means for supplying fluid under pressure sto said chambers so as to permit a pressure differential to be established therebetween;
   flexible means sealing said first chamber from said second chamber and operable to produce movement in response to changes in said pressure differential;
   output means operable to develop an output indication responsive to an applied input movement in a predetermined direction;
   means coupling said output means to said flexible means to apply to said output means an input movement in said predetermined direction in response to movement of said flexible means;
   sealing means enclosing said output means and filled with an incompressible liquid, said sealing means including resilient means permitting movement only in directions perpendicular to said predetermined direction in response to expansion or contraction of said liquid, whereby such expansion or contraction will not adversely affect the output indication of said output means.

2. Apparatus as claimed in claim 1 wherein said flexible means sealing said first chamber from said second chamber is a diaphragm.

3. Apparatus as claimed in claim 1 wherein said output means includes:
   an arm having a transverse aperture therein at its approximate midpoint;
   a support shaft disposed through said aperture in said arm and rigidly secured thereto; and
   said flexible means is coupled to said arm near one end thereof to thereby allow said arm to pivot about the axis of said support shaft upon application of said movement in said predetermined direction to said arm;
   wherein movement of said arm will produce an output indication to thereby indicate the magnitude of the movement in said predetermined direction.

4. Apparatus as claimed in claim 3 further including:
   a support column having a longitudinal passage therethrough;
   said arm is disposed within said passage of said support column; and
   said support shaft is rigidly secured in the walls of said support column.

5. Apparatus as claimed in claim 4 wherein the diameter of the ends of said support shaft rigidly secured to the walls of the support column and the diameter of the central section of the shaft passing through the aperture of said arm are greater than the diameter of the intermediate sections of said support shaft between said ends and said central section, thereby to provide a portion of said support shaft with a smaller cross-sectional area to permit proper torsional displacement of said support shaft.

6. Apparatus as claimed in claim 5 wherein said sealing means includes a flexible bellows completely enclosing said support column and indicating arm and incompressible liquid completely filling said bellows, wherein said liquid surrounds said indicating arm and acts as a vicous fluid damper to any movement of said arm.

7. An apparatus for indicating the magnitude of a lateral motion comprising:
   a support column having a longitudinal passage therethrough;
   an indicating arm disposed within said longitudinal passage;
   said indicating arm having a transverse aperture therein at its approximate midpoint;
   a support shaft rigidly secured in the walls of said support column;
   said support shaft being disposed within said transverse aperture of the indicating arm and rigidly secured to said arm;
   means to impart a lateral motion adapted to be secured to one end of said indicating arm;
   means in said support column to sense any relative movement of said indicating arm; and means secured to said support column to provide a sealed enclosure therefor filled with a compressible liquid to provide a viscous fluid damping action to any movement of said arm, said enclosure means including at least a flexible portion at said one end of said indicating arm to permit said lateral motion to be transmitted therethrough;

whereby upon application of lateral movement to said one end of said indicating arm a torsional stress is imparted to said support shaft causing said shaft to undergo a torsional deflection in the direction of torque applied and thereby allow said indicating arm to rotate about said support shaft and produce a signal in said sensing means.

8. Apparatus as claimed in claim 7 wherein said enclosure means comprises a flexible bellows completely enclosing said support column.

References Cited

UNITED STATES PATENTS

| | | | |
|---|---|---|---|
| 3,194,076 | 7/1965 | Gillen | 73—398 XR |
| 3,382,719 | 5/1968 | Villeneuve | 73—407 XR |

DONALD O. WOODIEL, Primary Examiner

U.S. Cl. X.R.

73—393, 398